US007945060B2

(12) United States Patent
Terada et al.

(10) Patent No.: US 7,945,060 B2
(45) Date of Patent: May 17, 2011

(54) PARAMETER DISPLAY METHOD AND PROGRAM THEREFOR, AND PARAMETER SETTING APPARATUS

(75) Inventors: Kotaro Terada, Hamamatsu (JP); Takamitsu Aoki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1446 days.

(21) Appl. No.: 10/973,199

(22) Filed: Oct. 25, 2004

(65) Prior Publication Data

US 2005/0090913 A1 Apr. 28, 2005

(30) Foreign Application Priority Data

Oct. 28, 2003 (JP) ................................ 2003-366837

(51) Int. Cl.
*H04B 1/00* (2006.01)

(52) U.S. Cl. ........................................................ 381/119

(58) Field of Classification Search .................. 381/119, 381/58, 118, 56, 57, 59, 61, 103, 101, 109, 381/102; 369/4; 700/94; 345/440
See application file for complete search history.

(56) References Cited

U.S. PATENT DOCUMENTS

| | | | | | |
|---|---|---|---|---|---|
| 4,879,751 | A * | 11/1989 | Franks et al. | 381/119 |
| 5,060,272 | A * | 10/1991 | Suzuki | 381/119 |
| 5,774,566 | A * | 6/1998 | Huber et al. | 381/119 |
| 5,959,610 | A * | 9/1999 | Silfvast | 345/156 |
| 6,438,241 | B1 * | 8/2002 | Silfvast et al. | 381/119 |
| 2002/0109710 | A1 | 8/2002 | Holtz et al. | |
| 2002/0159375 | A1 | 10/2002 | Eguchi et al. | |

FOREIGN PATENT DOCUMENTS

| | | |
|---|---|---|
| EP | 0 251 646 A2 | 1/1988 |
| JP | 2001-078300 | 3/2001 |
| JP | 2003-202880 | 7/2003 |
| WO | WO-91/18456 A1 | 11/1991 |

OTHER PUBLICATIONS

Yamaha AW4416 Professional Workstation Reference Guide. pp. 115-126. Sep. 2, 2003. {date is shown in US 7392101 B2, Other Publications}.*
Digital Production Console DM 2000 Owner's Manual, Yamaha Corporation, pp. 157-163.
Office Action mailed Mar. 20, 2009, for Chinese Patent Application No. 200410087908.7, with English Translation, 10 pages.
Yamaha Corporation. (Feb. 28, 2002). "Libraries," Chapter 14 in Digital Production Console DM 2000 Owner's Manual, pp. 142-146.
Office Action mailed Feb. 24, 2010, for Chinese Patent Application No. 200410087908.7, with English Translation, six pages.
European Search Report mailed May 6, 2010, for EP Application No. 04105241.6, three pages.

* cited by examiner

*Primary Examiner* — Vivian Chin
*Assistant Examiner* — Kile Blair
(74) *Attorney, Agent, or Firm* — Morrison & Foerster LLP

(57) ABSTRACT

Once an automatic setting instruction, such as a scene recall instruction, is given for instructing that a parameter to be set via an operator member should be automatically set to a given target value, automatic setting processing, such as scene recall processing, is performed to cause the current value of the parameter, to be set via the operator member, to gradually vary toward the given target value. During that time, the given target value and the current value of the parameter to be set via the operator member are displayed on a display device simultaneously or alternately. During the automatic setting processing, the target value can be changed as desired by a user, and, as the target value is changed, the changed or new target value is displayed on the displayed device.

7 Claims, 4 Drawing Sheets

PARAMETER DISPLAY METHOD AND PROGRAM THEREFOR, AND PARAMETER SETTING APPARATUS

BACKGROUND OF THE INVENTION

The present invention relates to parameter display methods and programs therefor and parameter setting apparatus which are suited for use in digital mixers.

Recent mixing systems are provided with a function of storing, in memory, parameter values set via faders, volume control operator members, etc., ON/OFF states of various buttons and other settings or setting states (scene data) of the mixing system and then reproducing the thus-stored settings through one-touch operation by the user; one example of such recent mixing systems is known from "DM2000 Instruction Manual", published by Yamaha Corporation in February, 2002, Pages 160-163. For example, parameters in the scene data may include, in addition to the operating states of the operator members, outputs of MIDI events, outputs of GPI (General-Purpose Interface) events, etc.

When scene recall instructing operation has been performed, parameter values of the individual operator members have to be displayed on an operation panel in automatically-reproducible form. Specific display form of the parameter value differs among the types of the operator members. For each of the faders, the parameter value is displayed by a current operating position of the fader; thus, for automatic reproduction of the parameter values on the operation panel, it is necessary to provide a drive mechanism, such as a motor, to physically drive the faders.

Further, in the mixing systems, predetermined switches each have an LED built therein to display an operating state of the switch by an ON/OFF state of the LED. The operating state of the switch can be reproduced by automatically turning on/off the LED in accordance with a memory-stored setting. Generally, for each of the volume control members, a plurality of LEDs are disposed circularly around the volume control member, so as to indicate the parameter value of the volume control member by respective illuminating states of these circularly-disposed LEDs. According to the disclosure of the above-mentioned "DM2000 Instruction Manual", a time length necessary for an operator member, such as a fader, to reach an operating position corresponding to a target value after a user's scene data recall instruction is referred to as "fade time", and a human operator or user is allowed to set a desired fade time for each of the operator members.

With the above-discussed technique, however, the user can not readily confirm the target values of the individual parameters until the scene recall is completed. Therefore, where it is likely that any of the parameters will fail to reach a desired state on completion of the scene recall, there arises a need to cease the scene recall on the way and manually operate the operator members.

SUMMARY OF THE INVENTION

In view of the foregoing, it is a first object of the present invention to provide a parameter display method, apparatus and program which, when an automatic setting instruction, such as a scene recall instruction, has been given, allow a user to readily confirm a target value of a desired parameter even during parameter value change processing. It is a second object of the present invention to allow the user to change a target value of the desired parameter before the target value is reached (i.e., on the way through the scene recall processing) in the above situation.

The present invention provides an improved method for displaying a parameter to be set via an operator member, which comprises: a step of detecting when an automatic setting instruction has been given for instructing that the parameter to be set via the operator member should be automatically set to a given target value; and a display step of, when the automatic setting instruction has been given, simultaneously or alternately displaying the given target value and a current value of the parameter, to be set via the operator member, that varies toward the target value.

When an automatic setting instruction has been given for instructing that the parameter to be set via the operator member should be automatically set to a given target value, the given target value and the current value of the parameter, to be set via the operator member, that is varying toward the target value are displayed simultaneously or alternately. Thus, the present invention can advantageously allow the user to readily confirm the target value before the current value reaches the target value. Also, the user can readily and accurately identify current progress of automatic parameter setting processing for the operator member.

As an example, the present invention can be applied to a scene recall function of an audio mixer. In such a case, the above-mentioned operator member corresponds to any one of a plurality of operator members in the audio mixer, and the above-mentioned automatic setting instruction corresponds to a scene recall instruction, and the above-mentioned given target value corresponds to target value data for any one of the operator members read out from a scene memory in association with the operator member. With such application, the user can readily visually confirm a target value of each of the operator members (various parameters) at any desired point during a period from the start to end of scene recall processing in the audio mixer.

The present invention also provides a method which further comprises: a step of detecting when a change instruction has been given for instructing that the given target value be changed; and a step of switching the target value, to be displayed by the display step, over to a changed, new target value in response to the change instruction. With such arrangements, the user can modify or change the target value as desired before the current value reaches the target value. In accordance with such a change, the target value to be displayed can be switched over to a changed (or new) target value. Also, the user can readily and accurately identify current progress of the automatic parameter setting processing for the operator member, even when the target value has been changed on the way through the processing.

The present invention may be constructed and implemented not only as the method invention as discussed above but also as an apparatus invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE EMBODIMENTS

Figure 1:
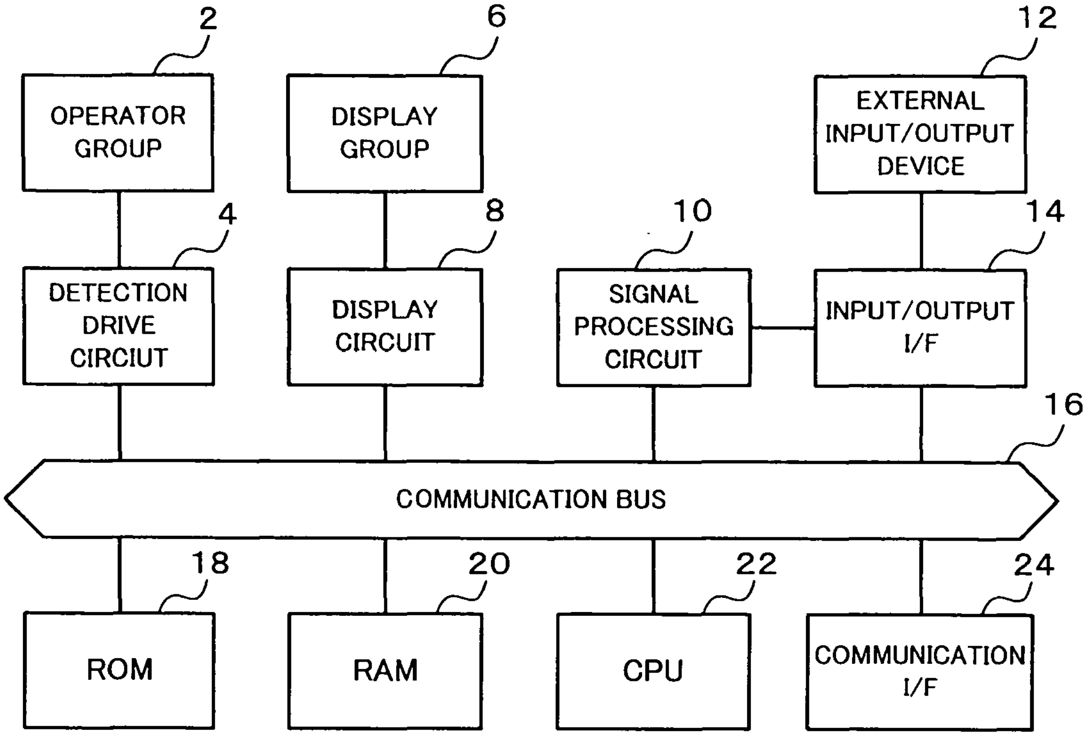
FIG. 1 is a block diagram showing a general hardware setup of a digital mixer in accordance with an embodiment of the present invention

1. Hardware Setup 1.1. General Hardware Setup of Embodiment:

With reference to FIG. 1, a description will be given about a general hardware setup of a digital mixer in accordance with an embodiment of the present invention.

The digital mixer of FIG. 1 includes a group of operator members 2 that includes faders, volume control operator members, switches, a mouse, a keyboard, etc. The digital mixer also includes a detection/drive circuit 4 that detects operation events of the operator members 2 and outputs data indicative of the detected operation events via a communication bus 16, and the circuit 4 also drives the faders via motors. The digital mixer further includes a group of display devices and elements 6, which include LEDs built in the switches, LEDs provided around each of the volume control operator members, a small-size display device for displaying channel names etc., and an LCD display device having a great-size screen. Display circuit 8 controls display states of these display devices and elements 6 on the basis of display commands supplied via the communication bus 16.

Further, in the digital mixer of FIG. 1, an input/output interface 14 inputs and outputs analog or digital audio signals from and to an external input/output device 12. Signal processing circuit 10 comprises a group of DSPs (Digital Signal Processors). The signal processing circuit 10 performs mixing processing and effect processing on the digital audio signals supplied via the input/output interface 14, and it outputs the processed results to the input/output interface 14. Reference numeral 22 represents a CPU that controls various components of the digital mixer, via the communication bus 16, on the basis of control programs stored in a ROM 18. RAM 20 is used as a working memory for the CPU 22 and also stores scene data as will be later described. Communication interface 24 inputs and outputs control data, etc. from and to external equipment.

Figure 2:
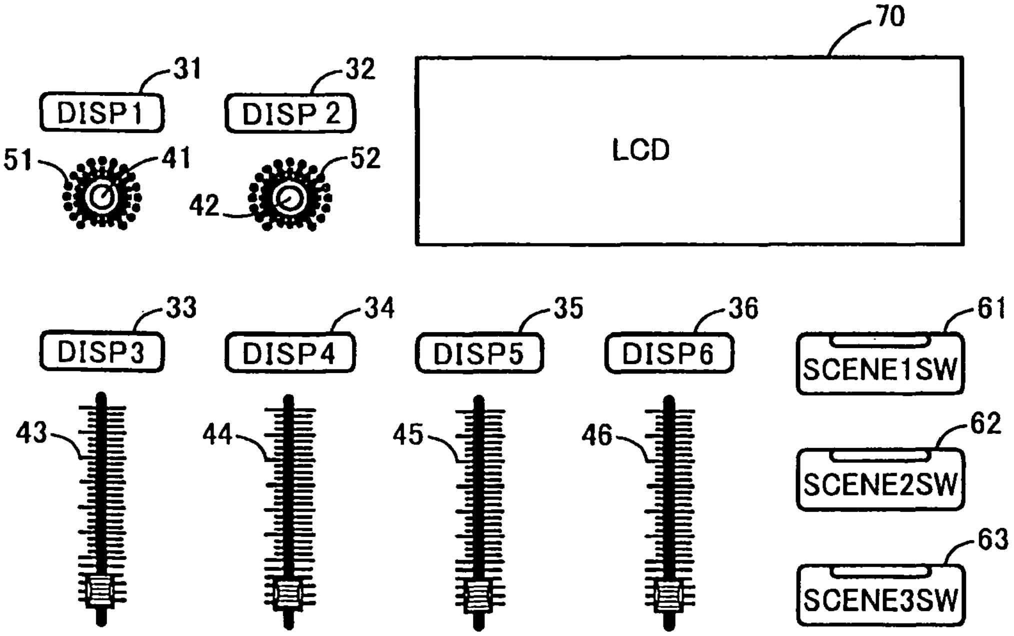
FIG. 2 shows an example structure of a principal section of an operation panel employed in the digital mixer of FIG. 1.

1.2. Structure of Operation Panel:

FIG. 2 shows an example structure of a principal section of an operation panel employed in the digital mixer, where reference numerals 43, 44, 45 and 46 represent electric faders for setting attenuation levels of four input channels. The electric faders 43-46 are not only manually operable by the user but also automatically controllable under control of the CPU 22. Rotary encoders 41 and 42 are used to set respective attenuation levels of left and right output channels. Reference numerals 51 and 52 represent two groups of level-indicating LEDs surrounding the rotary encoders 41 and 42; each of the groups comprises, for example, dozens of level-indicating LEDs. These level-indicating LEDs are disposed around the corresponding rotary encoder 41 or 42 in a substantial annular configuration with no LED provided along a lower end portion of the rotary encoder. Illumination state of the level-indicating LEDs indicates a current operating position of the corresponding rotary encoder 41 or 42. Namely, if a particular parameter to be displayed is of a minimum value, only the level-indicating LED located at a lower left end of the group is illuminated or turned on. Each time the parameter value increases by a predetermined increment (i.e., resolution width), the next level-indicating LED, located to the right of the last-illuminated level-indicating LED, is illuminated. Once the parameter reaches a maximum value, the last LED in the LED group is illuminated, so that all of the level-indicating LEDs are now placed in the illuminated state.

Reference numerals 31 to 36 represent channel display elements which are provided immediately above the rotary encoders 41, 42 and electric faders 43 to 46. The channel display elements 31 to 36 display information of input/output channels corresponding to the electric faders 43 to 46 etc. For example, in normal condition, the information displayed on each of the channel display elements 31-36 is a “channel number” or “channel name” of the corresponding input/output channel. Normally, which of the “channel number” and “channel name” of the corresponding input/output channel should be displayed on the channel display element 31-36 can be selected or designated by the user. Further, during scene recall processing to be later described in detail, current values or target values of corresponding parameters are displayed in numerical value on the channel display elements 31 to 36.

In the digital mixer of FIG. 1, scene data of a total of three scenes (i.e., first, second and third scenes) can be stored in the RAM 20. Scene switches 61, 62 and 63 are provided for storing and recalling the first, second and third scenes, respectively. Each of the scene switches 61, 62 and 63 operates as a scene recalling switch, when it is merely depressed alone. However, each of the scene switches 61, 62 and 63 operates as a switch for storing, in the RAM 20, stored contents of a current buffer, indicative of current states of the digital mixer, as corresponding scene data, when the scene switch is operated in a predetermined manner, e.g. by being depressed concurrently with a special key. The LCD display device 70 includes a dot-matrix display structure comprising hundreds (or thousands) of dots in each of the row and column directions, which displays various information, images, etc. under control of the CPU 22.

Figure 6:
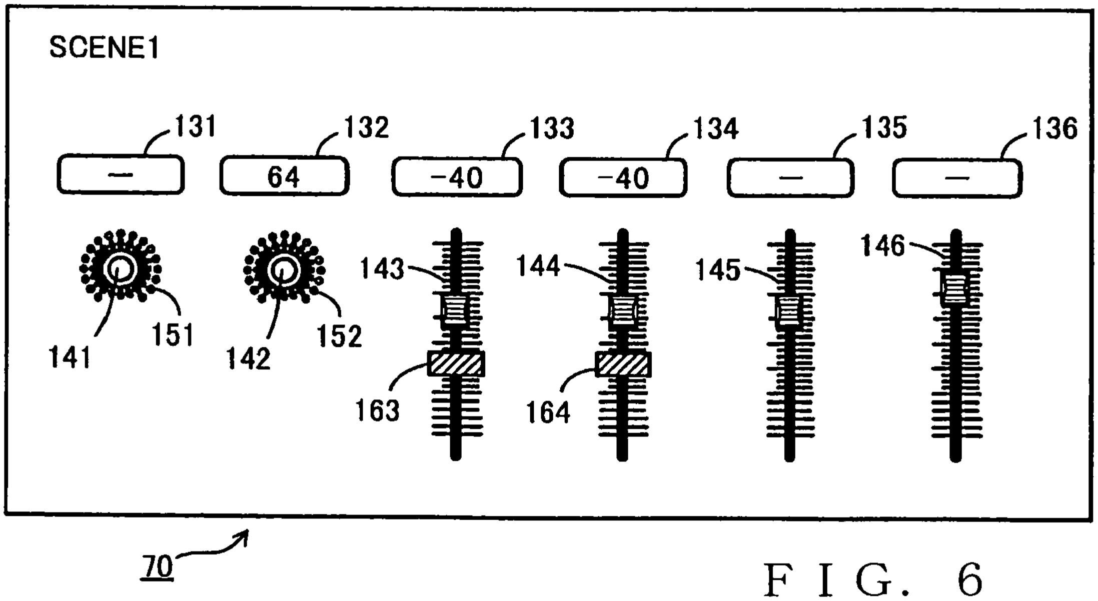
FIG. 6 is a diagram showing example displays on an LCD display device.

1.3. Example of Display on the LCD Display Device 70:

Images to be displayed on the LCD display device 70 can be selected by the user. For example, when a specific parameter, such as a frequency characteristic, is to be set for any one of the input/output channels, a predetermined screen, via which the corresponding parameter can be displayed and edited, is displayed on the LCD display device 70. Also, on the LCD display device 70, there can be displayed images imitating or emulating part of the operation panel, as illustratively shown in FIG. 6. In FIG. 6, reference numerals 131-136 represent images of channel display elements, which display information similar to that displayed by the channel display elements 31-36.

Reference numerals 141 and 142 represent images of rotary encoders, 143-146 represent images of electric faders and 151 and 152 represent images of level-indicating LED groups, which emulate the rotary encoders 41 and 42, electric faders 43-46 and level-indicating LED groups 51 and 52, respectively. Namely, the images of level-indicating LED groups 151 and 152 are set to display illuminating states similar to those of the level-indicating LED groups 51 and 52, and the images of electric faders 143-146 are set to display the same fader operating positions as the electric faders 43-46.

The user can operate or manipulate each of the images of rotary encoders 141 and 142 and images of electric faders 143-146, displayed on the LCD display device 70, via the mouse included in the operator member group 2. Also, the user can edit a channel name or the like, displayed on any one of the images of channel display elements 131-136, by clicking on the channel display element image and then entering letters and/or characters. Namely, any user's operation on the LCD display device 70 is immediately reflected in any one of the operating position of the rotary encoders, faders, etc. or in the displayed character string on any one of the channel display elements 31-36. Conversely, as any one of the rotary encoders 41 and 42, electric faders 43-46, etc. is operated by the user, the user's operation is automatically reflected on the screen of the LCD display device 70.

Figure 3:
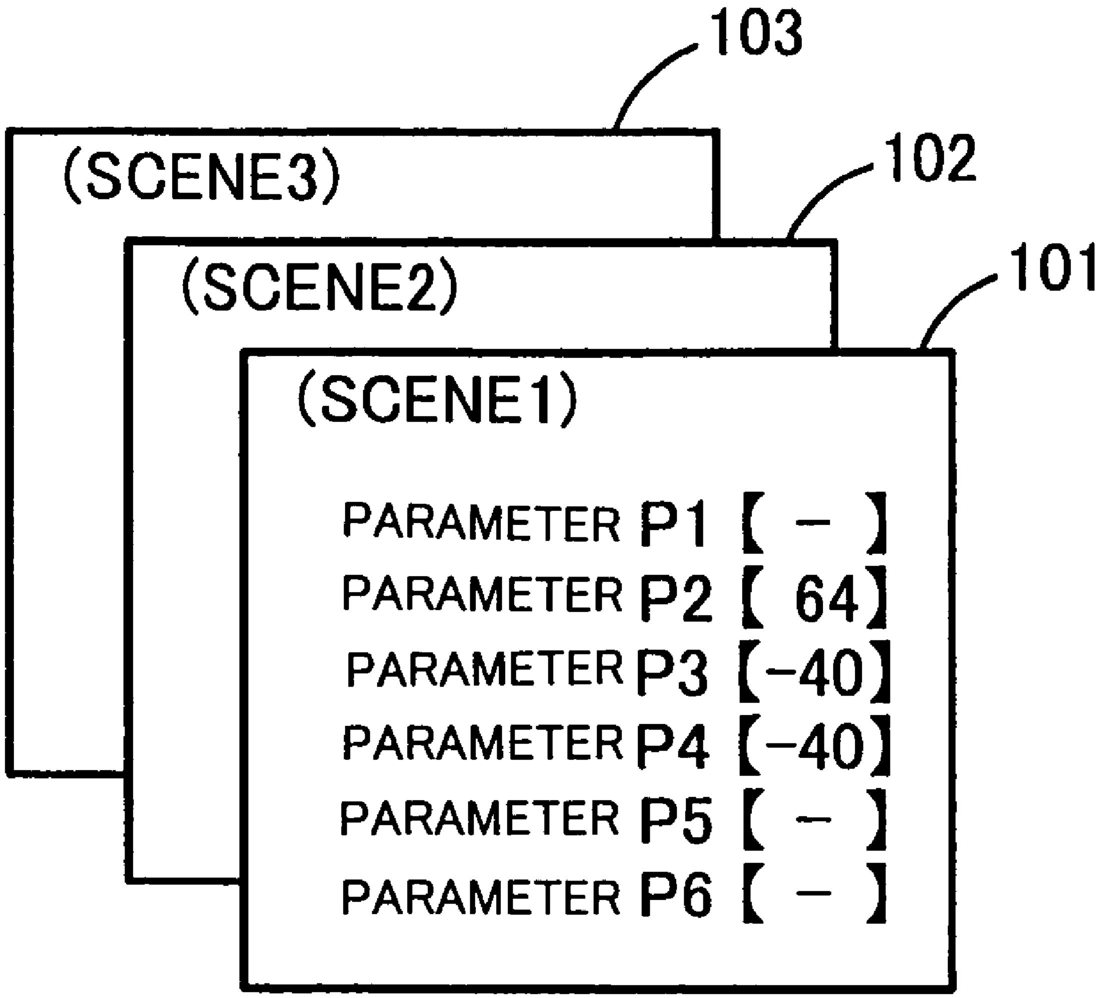
FIG. 3 is a diagram explanatory of a structure of scene data.

1.4. Data Structure:

Structures of scene data etc. recorded in the RAM 20 will be explained with reference to FIG. 3. In the figure, reference numerals 101, 102 and 103 represent sets of scene data provided in corresponding relation to the first, second and third scenes. In the scene data set 101, target values are stored for a plurality of parameters P1-P6. These target values indicate respective target attenuation levels of the left and right output channels and four input channels. Also, in the illustrated example, the parameters, for which only a "-" mark is stored, are parameters not intended for scene recall processing.

Further, in the RAM 20, there are provided current buffers C1-C6 and retention buffers B1-B6, in addition to the areas for storing the scene data. The retention buffers B1-B6 are buffers for storing individual parameters of recalled scene data. The current buffers C1-C6 are buffers for storing respective current attenuation levels of the left and right output channels and four input channels.

2. Behavior of the Embodiment

The following paragraphs describe general behavior of the instant embodiment.

Figure 4:
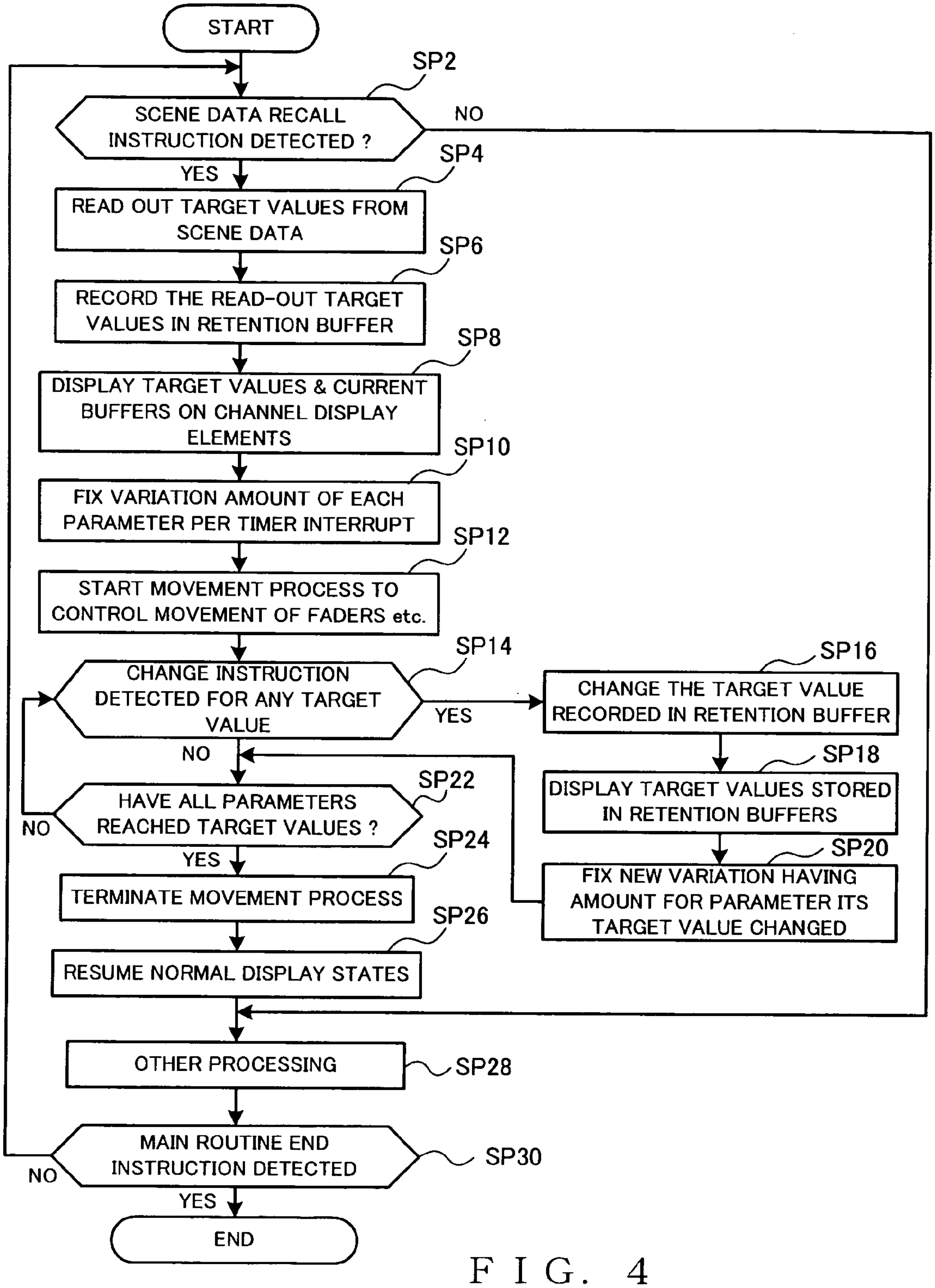
FIG. 4 is a flow chart of a main routine performed in the embodiment.

Upon turning-on of the instant embodiment of the digital mixer, a main routine illustrated in FIG. 4 is started up. At step SP2, a determination is made as to whether or not a scene data recall instruction, i.e. depression event of any one of the scene switches 61, 62 and 63, has been detected. If a "NO" determination is made at step SP2, the main routine jumps to step SP28, where other processing than the scene recall processing is carried out as will be later detailed.

If, on the other hand, a "YES" determination is made at step SP2, the main routine goes to step SP4, where respective target values of the parameters P1-P6 are read out from the recalled scene data and stored in the corresponding retention buffers B1-B6 (step SP6). Then, at step SP8, the current values and the target values stored in the retention buffers B1-B6 are displayed on the channel display elements 31-36, in response to which the displayed contents of the LCD display device 70 are updated to reflect the target values and current values.

Such operation at step SP8 is explained in greater detail, using specific examples. For instance, in the example of the scene data 101 of FIG. 3, target values are defined for the parameters P2, P3 and P4, and the other parameters are excluded from the objects of the scene recall. Therefore, current values and target values of the corresponding parameters, i.e. attenuation levels, are displayed on the channel display elements 32, 33 and 34 for the right output channel and first and second input channels. Here, if the channel display elements each have a sufficient display area, both the current values and the target values may be displayed simultaneously; otherwise, the current values and the target values may be displayed alternately at predetermined time intervals. On the channel display elements 31, 35 and 36 associated with the parameters not set as the object of the scene recall, on the other hand, only the "-" mark is displayed.

In the level-indicating LED group 52, one LED corresponding to the target value is set in a dark illuminating state with a lower luminance level than the normal illuminating (i.e., light illuminating) state. As noted above, in the level-indicating LED group 52, one or more LEDs are placed in the normal light illuminating state starting with the one located at the lower left end of the group 52, in accordance with a current value of the parameter. The target value may be either greater than the current value or lower than the current value. In either case, the one LED corresponding to the target value can be clearly distinguished from the other LEDs, and thus the target value and the current value can be appropriately displayed simultaneously via the level-indicating LED group 52. Because the parameter associated with the level-indicating LED group 51 is not the object of the scene recall, the level-indicating LED group 51 continues to provide a normal or ordinary level display.

On the LCD display device 70, the channel display images 131-136 and level-indicating LED images 151 and 152 provide displays similar to those provided by the channel display elements 31-36 and level-indicating LED images 51 and 52. Further, on the electric fader images 143 and 144, target value cursors 163 and 164, each in the form of a rectangular shade, are displayed at positions corresponding to target values. In this way, the user can readily identify visually the electric faders as the objects of the scene recall and their current and target values, on the basis of the electric fader images 143-146.

Fade time (i.e., time length for a parameter to reach a target value after scene recall processing is initiated) is fixed in advance for each of the electric faders and rotary encoders. Later-described time interrupt processing is executed at predetermined time intervals during the fade time, and each of the parameters gradually approaches the target value each time the timer interrupt signal is generated. At step SP10 of FIG. 4, variation amounts for the individual parameters per timer interrupt are determined or fixed. For example, if the fade time is "60" seconds and the timer interrupt interval is 10 msec., then "6,000" timer interrupt signals will be generated during the fade time. In this case, the parameter variation amount per timer interrupt signal can be calculated by "(target value-parameter value immediately before the recall instruction)/6,000".

At following step SP12, a movement process is carried out for updating the parameters in response to the timer interrupts, moving the electric faders and illuminating/deilluminating the LED groups 51 and 52. This movement process will be later described in greater detail. At next step SP14, a determination is made as to whether a change instruction has been detected for any of the target values. Namely, even during the scene recall processing, the user can edit any desired one of numerical values indicated by the channel display images 131-136 using the keyboard or otherwise, and the user can also vary the position of any one of the target value cursors 163 and 164 through drag and drop operation via the mouse. Namely, the user can change the target value of any desired parameters even during the scene recall processing.

Once such target-value changing operation is detected, a "YES" determination is made at step SP14, so that the routine branches to SP16. At step SP16, any one of the target values stored in the retention buffers B1-B6, corresponding to the changing operation, is switched over to a newly-designated (i.e., changed, new) target value. At following step SP18, the target values currently stored in the retention buffers B1-B6 are reflected in the displays on the corresponding channel display elements 31-36 and channel display element images 131-136. At next step SP20, a new variation amount is fixed for the parameter etc. having been subjected to the target value change. Namely, because the fade time must be maintained absolutely despite the parameter value change, the new variation amount is determined by "(target value-current parameter value)/remaining number of the time interrupts".

At step SP22, a further determination is made as to whether the current values of all the parameters have reached their respective target values, namely, whether the stored values of the current buffers C1-C6 have all equaled (or agreed with) the stored values of the retention buffers B1-B6. With a "NO" determination at step SP22, the routine reverts to step SP14. Then, unless target-value changing operation is performed by the user, the operations of steps SP14 and SP22 are repeated in a loop-like manner until a "YES" determination is made at step S22.

Figure 5:
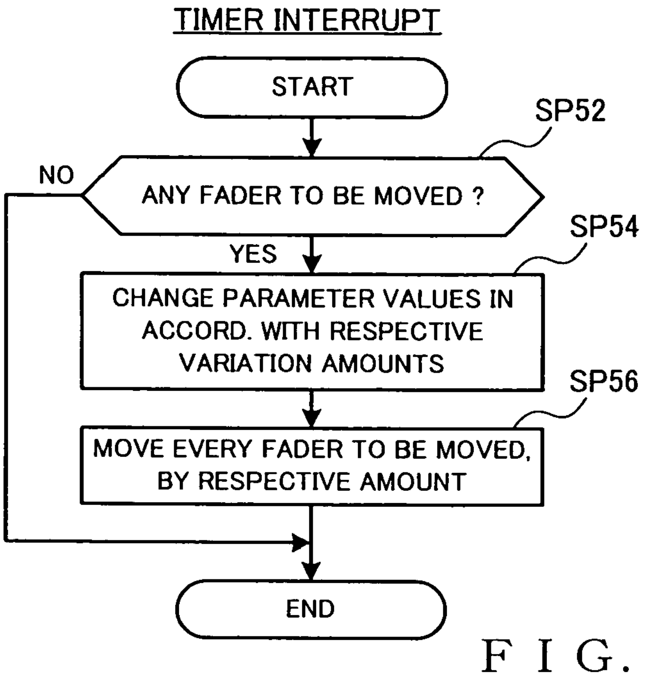
FIG. 5 is a flow chart of a timer interrupt routine performed in the embodiment.

Here, the movement process started at step SP12 is explained more fully. In the movement process, the timer interrupt is generated every predetermined time (e.g., 10 msec.), in response to which a timer interrupt routine of FIG. 5 is executed. At step SP 52 of FIG. 5, a determination is made as to whether any one of the electric faders etc. is to be moved, i.e. a comparison is made between the stored values of the retention buffers B1-B6 and the stored values of the current buffers C1-C6 to see if there is any parameter for which the stored value of the retention buffer and the stored value of the current buffer do not agree with each other. If the stored values of the current buffer have all equaled the stored values of the retention buffers B1-B6 2, a "NO" determination is made at step S52, the routine is immediately brought to an end.

If the stored value of the current buffer fails to equal the stored value of the retention buffer for at least one of the parameters, a "YES" determination is made and thus the routine goes to step SP54, where the respective variation amounts are added to the parameter values stored in the current buffers C1-C6 so as to change or update the parameter values. The changed or updated parameter values are immediately set into the register of the signal processing unit 10, so that actual levels etc. of audio signals are controlled in accordance with the changed or updated parameter values.

At next step SP56, the electric faders of all of the input channels, set as the objects of the scene recall, are moved to positions corresponding to the changed parameter values (attenuation levels). Also, for the output channels, the illuminating/deilluminating states of the level-indicating LED groups are varied. By the above-described operations being repeated in response to every time interrupt, the positions of the individual electric faders and the illuminating/deilluminating states of the level-indicating LED groups change gradually, and the stored contents of the current buffers C1-C6 gradually approach the stored contents of the retention buffers B1-B6. In this manner, the stored values of all of the current buffers C1-C6 will ultimately agree with the stored values of the retention buffers B1-B6 when the fade time has expired.

Referring back to step SP22 of FIG. 4, if it is determined that the current values of all the parameters have reached their respective target values, i.e., that the stored values of all the current buffers have equaled the stored values of the retention buffers, a "YES" determination is made at step SP22, so that the routine moves on to step SP 24. At step S24, the movement process is terminated. Then, at step SP26, various display states are brought back to the normal display states. Namely, the channel numbers or channel names are displayed on the channel display elements 31-36 and channel display images 131-136, and the LEDs, having been placed in the dark illuminating state to indicate the target values in the level-indicating LED groups 51 and 52, are brought back to the illuminating state. Also, the target cursors 163 and 164 are erased from the electric fader images 143-146 on the LCD display device 70.

At next step S28, various other operations than the above operations pertaining to the scene recall are carried out. For example, once the user operates any one of the electric faders 43-46, rotary encoders 41, 42, etc., the operation event is detected, and the stored contents of the current buffer C1-C6 are updated in accordance with a current operating position of the operated operator member. Then, the updated contents of the current buffer C1-C6 are set as parameters to be given to the signal processing circuit 10, so that the attenuation levels etc. of audio signals are controlled in accordance with the parameters. If an image of the operated electric fader, rotary encoder or the like has so far been displayed on the LCD display device 70, the image is also updated.

Further, if the operating position of any one of the rotary encoder images 141, 142 or electric fader images 143-146 has been dragged and dropped via the mouse, the current buffers C1-C6 are updated to reflect the new operating position, and the illuminating states of the level-indicating LED groups 51 and 52 and operating positions of the electric faders 43-46 on the operation panel are updated on the basis of the stored contents of the current buffers C1-C6. At next step SP30, a determination is made as to whether an end instruction has been given for terminating the main routine (FIG. 4). With a "NO" determination, the operations at and after step SP2 are repeated, while, with a "YES" determination, the routine is brought to an end.

3. Modification

The present invention may be modified variously as follows without being limited to the above-described embodiment.

(1) The above-described embodiment is arranged to display parameters by the CPU 22 etc. of the digital mixer executing various programs. The programs alone may be stored on a storage medium, such as a CD-ROM or flexible disk, for distribution via the storage medium, or may be distributed via transmission paths.

(2) In the above-described embodiment, the level-indicating LEL groups 51 and 52 are each arranged to display a target value by placing a particular LED, corresponding to the target value, in the dark illuminating state. However, the level-indicating LEL group may display the target value without using the dark illuminating state. Namely, when the target value is higher than the current value, the corresponding LED may be placed in the light illuminating state, while, when the target value is lower than the current value, the corresponding LED may be deilluminated. Because the illuminating/deilluminating state of the target-value-indicating LED is different from those of LEDs adjoining to both sides of the target-value-indicating LED, the target-value-indicating LED can be readily distinguished from the other LEDs. In this modification, each of the LEDs takes only two states: light illuminating state; and deilluminating state, so that the circuit for driving the level-indicating LEL groups can be simplified significantly.

(3) Furthermore, the preferred embodiment has been described in relation to the case where the basic principles of the present invention are applied to a digital mixer, the present invention may be applied to various devices and equipment other than the digital mixer, such as analog mixers and other parameter adjusting devices.

What is claimed is:

1. A method for displaying parameters to be set via a plurality of operator members of an audio mixer, which comprises:

a first display step of displaying current values of the parameters to be set via said operator members;

a step of detecting when an automatic setting instruction has been given for instructing that the parameters to be set via said operator members should be automatically set to respective given target values;

a second display step of, when the automatic setting instruction has been given, reading out the given target values from a memory and displaying the given target values read out from the memory;

a control step of, in response to the automatic setting instruction, gradually varying the current values of the respective parameters to be set via said operator members toward the respective given target values read out from the memory, wherein, while the current values of the parameters are being varied by said control step, said first display step updates the current values of the parameters and displays the updated current values;

a first display control step of (1) controlling the first and second display steps so that the given target values to be displayed via said second display step and the current values of the parameters to be displayed via said first display step are simultaneously or alternately displayed, before the current values of the parameters reach the given target values, but (2) controlling said first and second display steps so that only the current values of the parameters are displayed via said first display step, after the current values of the parameter reach the given target values, a second display control step of controlling a display device to simultaneously display a plurality of operator images corresponding to said plurality of operator members on a display screen of the display device, each of said operator images including an indicator image indicative of a current position of a corresponding one of said plurality of operator members, said indicator image being movable along a moving axis set in the operator image displayed on the display screen;

a third display control step of, in response to the automatic setting instruction, displaying target images indicative of respective positions corresponding to the given target values read out from the memory, each of the target images being displayed at the position corresponding to the given target value on the moving axis set in the corresponding one of said plurality of operator images;

a storing step of storing said given target values read out from the memory, the target values stored in a buffer being used in said second display control step, said control step, said first display control step and said third display control step as said given target values read out from the memory;

a detecting step of detecting when a change instruction has been given for instructing that any one of the given target values be changed while said control step is gradually varying the current values of the respective parameters; and a switching step of renewing any of the target values stored in the buffer with a changed, new target value in response to the change instruction to thereby switch the corresponding target value displayed via said second display step to the new target value stored in the buffer as well as the target image displayed on the display screen, wherein said control step changes a speed of the variation of the current value of the parameter corresponding to the changed target value to a new speed that is determined on the basis of a difference between the new target value and the current value of the parameter.

2. A computer-readable medium storing a program for causing a processor device to perform a method for displaying, on a display device, parameters to be set via operator members of an audio mixer, said method comprising:

a first display step of displaying current values of the parameters to be set via said operator members;

a step of detecting when an automatic setting instruction has been given for instructing that the parameters to be set via said operator members should be automatically set to respective given target values;

a second display step of, when the automatic setting instruction has been given, reading out the given target values from a memory and displaying the given target values read out from the memory;

a control step of, in response to the automatic setting instruction, gradually varying the current values of the respective parameters to be set via said operator members toward the respective given target values read out from the memory, wherein, while the current values of the parameters are being varied by said control step, said first display step updates the current values of the parameters and displays the updated current values;

a first display control step of (1) controlling the first and second display steps so that the given target values to be displayed via said second display step and the current values of the parameters to be displayed via said first display step are simultaneously or alternately displayed, before the current values of the parameters reach the given target values, but (2) controlling said first and second display steps so that only the current values of the parameters are displayed via said first display step, after the current values of the parameter reach the given target values, a second display control step of controlling a display device to simultaneously display a plurality of operator images corresponding to said plurality of operator members on a display screen of the display device, each of said operator images including an indicator image indicative of a current position of a corresponding one of said plurality of operator members, said indicator image being movable along a moving axis set in the operator image displayed on the display screen;

a third display control step of, in response to the automatic setting instruction, displaying target images indicative of respective positions corresponding to the given target values read out from the memory, each of the target images being displayed at the position corresponding to the given target value on the moving axis set in the corresponding one of said plurality of operator images;

a storing step of storing said given target values read out from the memory, the target values stored in a buffer being used in said second display control step, said control step, said first display control step and said third display control step as said given target values read out from the memory;

a detecting step of detecting when a change instruction has been given for instructing that any one of the given target values be changed while said control step is gradually varying the current values of the respective parameters; and a switching step of renewing any of the target values stored in the buffer with a changed, new target value in response to the change instruction to thereby switch the corresponding target value displayed via said second display step to the new target value stored in the buffer as well as the target image displayed on the display screen, wherein said control step changes a speed of the variation of the current value of the parameter corresponding to the changed target value to a new speed that is determined on the basis of a difference between the new target value and the current value of the parameter.

3. A parameter setting apparatus for an audio mixer, said parameter setting apparatus comprising:

a plurality of operator members for setting parameters;

an instruction section that issues an automatic setting instruction for instructing that the parameters to be set via said operator members should be automatically set to respective given target values;

a first display section that displays current values of the parameters to be set via said operator members;

a second display section that, when the automatic setting instruction has been issued by said instruction section, reads out the given target values from a memory and displays the given target values read out from the memory;

a control section that, in response to the automatic setting instruction, gradually varies the current values of the respective parameters to be set via said operator members toward the respective given target values read out from the memory, wherein, while the current values of the parameters are being varied by said control section, said first display section updates the current values of the parameters and displays the updated current values;

a first display control section that (1) controls the first and second display sections so that the given target values to be displayed via said second display section and the current values of the parameters to be displayed via said first display section are simultaneously or alternately displayed, before the current values of the parameters reach the given target values, but (2) controls said first and second display sections so that only the current values of the parameters are displayed via said first display section, after the current values of the parameter reach the given target values;

a display device;

a second display control section that controls the display device to simultaneously display a plurality of operator images corresponding to said plurality of operator members on a display screen of the multi-functional display device, each of said operator images including an indicator image indicative of a current position of a corresponding one of said plurality of operator members, said indicator image being movable along a moving axis set in the operator image displayed on the display screen;

a third display control section that, in response to the automatic setting instruction, displays target images indicative of respective positions corresponding to the given target values read out from the memory, each of the target images being displayed at the position corresponding to the given target value on the moving axis set in the corresponding one of said plurality of operator images;

a buffer for storing said given target values read out from the memory, the target values stored in the buffer being used in said second display section, said control section, said first display control section and said third display control section as said given target values read out from the memory;

a detection section that detects when a change instruction has been given for instructing that any one of the given target values be changed while said control section is gradually varying the current values of the respective parameters; and a switching section that renews any of the target values stored in the buffer with a changed, new target value in response to the change instruction to thereby switch the corresponding target value displayed via said second display section to the new target value stored in the buffer as well as the target image displayed on the display screen, wherein said control section changes a speed of the variation of the current value of the parameter corresponding to the changed target value to a new speed that is determined on the basis of a difference between the new target value and the current value of the parameter.

4. The parameter setting apparatus as claimed in claim 3 wherein the target values to be displayed via the second display section and the current values to be displayed via the first display section are displayed in different display styles on calibrated display elements provided in association with each of said operator members.

5. The parameter setting apparatus as claimed in claim 4 wherein a luminance level of the calibrated display elements is differentiated between a position indicating the target value and a position indicating the current value.

6. The parameter setting apparatus as claimed in claim 3 wherein each of said operator members includes a knob operable by a human operator and also operable automatically, wherein said first display section displays each of the current values of the parameters with a current position of the knob corresponding to each of said operator members, wherein said second display section displays each of the given target values on an individual display unit provided near each of said operator members, and wherein, when the automatic setting instruction has been given, the knob corresponding to each of said operator members is automatically moved toward a position corresponding to each of the given target values, each of the current values of the parameters being set via each of said operator members is displayed in accordance with a current position of the corresponding knob, and each of the given target value is displayed on the individual display unit.

7. The parameter setting apparatus as claimed in claim 3 wherein the target values are values for reproducing set parameters of said operator members stored in a scene memory of the audio mixer, and the automatic setting instruction is a scene reproducing instruction.

* * * * *